US010845183B2

(12) United States Patent
Jensen et al.

(10) Patent No.: US 10,845,183 B2
(45) Date of Patent: Nov. 24, 2020

(54) OPTICAL SENSOR ELEMENT FOR A MEASURING MACHINE, AND COUPLING ELEMENT THEREFOR ON THE MEASURING MACHINE SIDE

(71) Applicant: HEXAGON TECHNOLOGY CENTER GMBH, Heerbrugg (CH)

(72) Inventors: Thomas Jensen, Rorschach (CH); Frank Saupe, Tubach (CH); Benjamin Vullioud, Gollion (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 365 days.

(21) Appl. No.: 15/278,009

(22) Filed: Sep. 27, 2016

(65) Prior Publication Data

US 2017/0030702 A1  Feb. 2, 2017

Related U.S. Application Data

(63) Continuation of application No. 13/128,397, filed as application No. PCT/EP2009/065048 on Nov. 12, 2009, now abandoned.

(30) Foreign Application Priority Data

Dec. 3, 2008  (EP) ..................................... 08170582

(51) Int. Cl.
*G01B 11/00* (2006.01)
(52) U.S. Cl.
CPC .................................. *G01B 11/007* (2013.01)

(58) Field of Classification Search
CPC .............................. G01B 11/00; G01B 11/007
See application file for complete search history.

(56) References Cited

U.S. PATENT DOCUMENTS 4,561,776 A  12/1985  Pryor
4,733,969 A  3/1988  Case et al.
(Continued)

FOREIGN PATENT DOCUMENTS

CN  1098507 A  2/1995
CN  1115527 A  1/1996
(Continued)

OTHER PUBLICATIONS

DeCusatis, "Handbook of Fibre Optic Data Communication", Third Edition, Apr. 16, 2008, pp. 193-218.
(Continued)

*Primary Examiner* — Andrew Jordan
(74) *Attorney, Agent, or Firm* — Maschoff Brennan (57) ABSTRACT

The invention relates to an optical sensor element for a measuring machine, comprising a coupling element on the sensor element side for mechanically and optically connecting to a coupling element on the measuring machine side. An optical fiber is arranged in the coupling element on the sensor element side, wherein said optical fiber comprises an optical interface for connecting to an optical machine contact element of the measuring machine, wherein said optical interface is formed by an optical sensor contact element having a self-centering ferrule that encloses the end of the optical fiber. The ferrule is supported in the coupling element on the sensor element side in a floating manner.

19 Claims, 9 Drawing Sheets

(56) References Cited

U.S. PATENT DOCUMENTS

| | | | |
|---|---|---|---|
| 4,963,728 A | 10/1990 | Hof et al. | |
| 5,044,717 A | 9/1991 | Levatter | |
| 5,118,956 A | 6/1992 | Dunning et al. | |
| 5,154,002 A | 10/1992 | Ulbrich | |
| 5,214,730 A | 5/1993 | Nagasawa et al. | |
| 5,353,510 A | 10/1994 | Ulbrich | |
| 5,392,122 A | 2/1995 | Ulanov et al. | |
| 5,402,582 A | 4/1995 | Raab | |
| 5,481,634 A | 1/1996 | Anderson et al. | |
| 5,563,971 A | 10/1996 | Abendschein | |
| 5,590,229 A | 12/1996 | Goldman et al. | |
| 5,764,834 A | 6/1998 | Hultermans | |
| 5,845,026 A | 12/1998 | Lee et al. | |
| 5,917,726 A | 6/1999 | Pryor | |
| 6,273,619 B1 * | 8/2001 | Shahid | G02B 6/3874 |
| | | | 385/55 |
| 6,276,619 B1 | 8/2001 | Turk et al. | |
| 6,288,785 B1 | 9/2001 | Frantz et al. | |
| 6,396,069 B1 | 5/2002 | MacPherson et al. | |
| 6,415,191 B1 | 7/2002 | Pryor | |
| 6,540,411 B1 | 4/2003 | Cheng | |
| 6,651,351 B1 | 11/2003 | Christoph et al. | |
| 6,822,749 B1 * | 11/2004 | Christoph | G01B 11/007 |
| | | | 33/503 |
| 6,829,413 B2 | 12/2004 | Brooks et al. | |
| 6,856,381 B2 | 2/2005 | Christoph | |
| 7,116,882 B2 | 10/2006 | Watte et al. | |
| 7,282,017 B2 | 10/2007 | Jordil et al. | |
| 7,331,720 B1 | 2/2008 | McColloch | |
| 7,375,827 B2 | 5/2008 | Sanilevici et al. | |
| 7,414,732 B2 | 8/2008 | Maidhof et al. | |
| 7,427,165 B2 | 9/2008 | Benaron et al. | |
| 7,728,989 B2 | 6/2010 | Doherty et al. | |
| 7,735,234 B2 | 6/2010 | Briggs et al. | |
| 7,787,696 B2 | 8/2010 | Wilhelm et al. | |
| 7,908,757 B2 | 3/2011 | Ferrari | |
| 8,127,458 B1 | 3/2012 | Ferrari | |
| 8,429,828 B2 | 4/2013 | Ferrari | |
| 8,438,747 B2 * | 5/2013 | Ferrari | G01B 5/012 |
| | | | 33/503 |
| 8,439,747 B2 | 5/2013 | Pincus et al. | |
| 8,627,576 B2 | 1/2014 | Engel | |
| 8,817,240 B2 | 8/2014 | Jones et al. | |
| 8,823,930 B2 * | 9/2014 | Engel | G01N 21/88 |
| | | | 356/237.1 |
| 8,950,078 B2 * | 2/2015 | Engel | G01B 11/005 |
| | | | 33/502 |
| 8,955,229 B2 * | 2/2015 | Ferrari | G01B 5/012 |
| | | | 33/503 |
| 9,027,218 B2 * | 5/2015 | Slettemoen | B23Q 17/22 |
| | | | 29/407.01 |
| 9,068,822 B2 | 6/2015 | Sesko | |
| 9,188,428 B2 | 11/2015 | Engel | |
| 9,316,473 B2 | 4/2016 | Jensen et al. | |
| 10,234,272 B2 * | 3/2019 | Jensen | G01B 11/005 |
| 10,274,306 B2 * | 4/2019 | Scheja | G01B 21/047 |
| 2002/0025074 A1 | 2/2002 | Wilhelm | |
| 2002/0031306 A1 | 3/2002 | Ambrosy et al. | |
| 2002/0128790 A1 | 9/2002 | Woodmansee | |
| 2003/0098967 A1 | 5/2003 | Christoph | |
| 2003/0112448 A1 | 6/2003 | Maidhof et al. | |
| 2004/0017981 A1 | 1/2004 | Jovanovich et al. | |
| 2004/0121520 A1 | 6/2004 | Karkkainen | |
| 2005/0234344 A1 | 10/2005 | Sanilevici | |
| 2006/0098921 A1 | 5/2006 | Benaron et al. | |
| 2006/0218985 A1 | 10/2006 | Kenmochi et al. | |
| 2007/0047857 A1 | 3/2007 | Hamada et al. | |
| 2007/0293769 A1 * | 12/2007 | Doherty | A61C 13/0004 |
| | | | 600/476 |
| 2008/0250625 A1 | 10/2008 | Slettemoen | |
| 2009/0254299 A1 | 10/2009 | Tarazi | |
| 2010/0014099 A1 * | 1/2010 | Christoph | G01B 11/03 |
| | | | 356/602 |
| 2010/0095542 A1 | 4/2010 | Ferrari | |
| 2010/0225926 A1 | 9/2010 | van Amstel et al. | |
| 2010/0225928 A1 * | 9/2010 | Thelen | G01B 5/012 |
| | | | 356/601 |
| 2010/0299094 A1 | 11/2010 | Hsu | |
| 2011/0229091 A1 * | 9/2011 | Jensen | G01B 11/007 |
| | | | 385/78 |
| 2012/0041712 A1 | 2/2012 | Pettersson | |
| 2012/0047756 A1 | 3/2012 | Ferrari | |
| 2012/0210590 A1 | 8/2012 | Ferrari | |
| 2012/0246953 A1 | 10/2012 | Engel | |
| 2012/0262729 A1 | 10/2012 | Ferrari | |
| 2012/0327221 A1 | 12/2012 | Christoph et al. | |
| 2013/0035781 A1 * | 2/2013 | Cameron | B25J 9/1692 |
| | | | 700/186 |
| 2013/0050701 A1 | 2/2013 | Jensen et al. | |
| 2013/0314690 A1 | 11/2013 | Jones et al. | |
| 2014/0041242 A1 | 2/2014 | Engel | |
| 2014/0043464 A1 | 2/2014 | Engel et al. | |
| 2014/0043468 A1 | 2/2014 | Engel | |
| 2014/0043469 A1 | 2/2014 | Engel et al. | |
| 2014/0043470 A1 | 2/2014 | Winterot et al. | |
| 2014/0043602 A1 | 2/2014 | Engel | |
| 2014/0043610 A1 | 2/2014 | Engel et al. | |
| 2014/0098378 A1 | 4/2014 | Ferrari | |
| 2014/0125990 A1 | 5/2014 | Hinderling et al. | |
| 2014/0211191 A1 | 7/2014 | Jensen et al. | |
| 2014/0317942 A1 * | 10/2014 | Sagemueller | G01B 21/042 |
| | | | 33/503 |
| 2015/0009484 A1 * | 1/2015 | Sesko | G01B 11/007 |
| | | | 356/3 |
| 2015/0043013 A1 * | 2/2015 | Engel | G01B 11/007 |
| | | | 356/614 |
| 2015/0055143 A1 * | 2/2015 | Engel | G01B 21/047 |
| | | | 356/614 |
| 2015/0176956 A1 | 6/2015 | Pettersson et al. | |
| 2015/0176958 A1 | 6/2015 | Rouge et al. | |
| 2015/0204653 A1 | 7/2015 | Przygodda et al. | |
| 2015/0211850 A1 | 7/2015 | Harsila | |
| 2015/0219451 A1 | 8/2015 | Pettersson et al. | |
| 2015/0266183 A1 | 9/2015 | Alifragkis et al. | |
| 2015/0345937 A1 | 12/2015 | Seitz et al. | |
| 2015/0345940 A1 | 12/2015 | Sagemueller et al. | |
| 2016/0110873 A1 | 4/2016 | Engel et al. | |
| 2016/0131476 A1 | 5/2016 | Haverkamp | |
| 2017/0030702 A1 * | 2/2017 | Jensen | G01B 11/007 |
| 2017/0176172 A1 * | 6/2017 | Scheja | G02B 6/3881 |
| 2018/0112971 A1 * | 4/2018 | Jensen | G01B 11/026 |

FOREIGN PATENT DOCUMENTS

| | | | |
|---|---|---|---|
| CN | 1220013 A | 6/1999 | |
| CN | 1506706 A | 6/2004 | |
| CN | 101221268 A | 7/2008 | |
| DE | 43 25 337 A1 | 2/1994 | |
| DE | 10 2006 016056 A1 | 10/2006 | |
| EP | 0 362 625 A2 | 4/1990 | |
| EP | 0 936 484 A1 | 8/1999 | |
| EP | 1 474 650 A2 | 11/2004 | |
| FR | 2334969 A1 * | 7/1977 | G02B 6/32 |
| WO | 03/036358 A2 | 5/2003 | |
| WO | 2006/040126 A1 | 4/2006 | |

OTHER PUBLICATIONS

Semenov et al., "Structured cable systems", Springer, 2002, pp. 185-250.

Wrobel, "Optische Übertragungstechnik in der Praxis", Hüthig, Third Edition, 2004, pp. 85-116.

\* cited by examiner

OPTICAL SENSOR ELEMENT FOR A MEASURING MACHINE, AND COUPLING ELEMENT THEREFOR ON THE MEASURING MACHINE SIDE

The invention relates to an optical sensor element for a measuring machine, in particular for a coordinate measuring machine, as claimed in the preamble of claim 1, and to a coupling element on the measuring machine side as claimed in the preamble of claim 10.

Coordinate measuring devices or coordinate measuring machines have long been known in various embodiments. For example, these devices are used to measure object surfaces with high precision, in particular in the manufacturing industry, where the measurement and inspection of workpiece surfaces are very important.

Typical generic systems are coordinate measuring machines of the Portal type such as are described, for example, in DE 43 25 337, or 3D coordinate measuring articulated arms that, for example, are known from U.S. Pat. No. 5,402,582 or EP 1 474 650.

Such coordinate measuring machines have a base, which is known in a reference coordinate system and fixedly positioned, as one end of the measuring system or of the articulated arm, and an oppositely situated movable measuring end on which a probe element is arranged. A tactile probe that can be brought into contact with a measuring point of an object surface and consists, for example, of a ruby ball that is mounted on a measuring rod can be used as standard stylus. Optical sensor elements are beginning to become increasingly important in such coordinate measuring machines.

The world of measurement is currently being dominated to a large extent by tactile probe elements that are present in various embodiments, for example in order to probe the measurement object axially or laterally. The probe elements are designed in this case with different lengths and diameters in order to be able to reach even locations that are difficult to access.

In order to couple the tactile probe elements to coordinate measuring machines, mechanical and mechanical/electrical couplings have been developed such as emerge, for example, from U.S. Pat. No. 7,282,017 B2, which permit a very reproducible mechanical coupling via three ball-cylinder contacts and also enable electrical transmission of measuring signals via springed pin contacts. These interfaces can be designed such that there is space for the probe elements in a tool changer, and said elements can be accommodated independently of the coordinate measuring machine.

However, it goes hand in hand with the new optical measurement methods for coordinate measuring machines that there is also a need to guide an optical fiber from a sensor element to a control unit of the coordinate measuring machine, said optical fiber being used as optical conductor and for optical signal transmission of the measuring radiation. Given the lack of efficient optical couplings that enable frequent changes of sensor element, it has so far been possible to implement only coordinate measuring machines on which a sensor element is permanently fastened.

Suitable optical fibers are widespread in telecommunications for signaling transmission. In order to couple said optical fibers, a multiplicity of plug-in couplings exists that are coordinated with the respective application purposes, and enable even high energy optical radiation to be transmitted via the optical fibers and the plug-in couplings in conjunction with low losses. However, the plug-in couplings have a decisive disadvantage: they have been produced for static connections. Because of the high level of sensitivity of the optical interface to contamination and damage, they cannot be frequently plugged in. The forecast service life of the known couplings is 500 to 1000 plug-in cycles. However, in practice they are opened only to be serviced. In addition, in order to ensure optimum transmission, the cleaning of the surfaces of the optical fibers at the optical interface is required under a microscope before plugging together is undertaken anew.

In order to be able to use a coordinate measuring machine to measure complex measuring objects, for example engine blocks, there is a need to change the sensor element relatively frequently. As a rough estimate, there is a need for a sensor element to be changed approximately once per hour. Since the coordinate measuring machines often are driven round the hour, 100 plug-in cycles are easily reached per week, and so the optical plug-in couplings known from telecommunications would reach the end of their expected service life as early as after approximately 3 months.

In order for it to be possible to make rational use of optical sensor elements in coordinate measuring machines, the optical couplings must fulfill at least the same requirements with regard to robustness and precision as do the mechanical or mechanical/electrical coupling elements.

Proceeding from this state of the art, it is the object of the invention to demonstrate an optical sensor element and a measuring machine in the case of which the mechanical coupling is supplemented by an optical part, the optical interface needing to be capable of withstanding at least 50000 plug-ins without damage, being easy to clean, and also permitting measurements to be reliably continued given low levels of contamination.

The first part of the object is achieved by an optical sensor element for a measuring machine that has the features of claim 1, and by a coupling element on the measuring machine side having the features of claim 10. Advantageous embodiments of the optical sensor element follow from the dependent claims.

The optical sensor element has a coupling element on the sensor element side for mechanical and optical connection to the measuring machine and/or the coupling element thereof on the machine side. According to the invention, the optical sensor element further has an optical fiber in the coupling element on the sensor element side, and an optical interface that is guided by a floating bearing.

Figure 1:
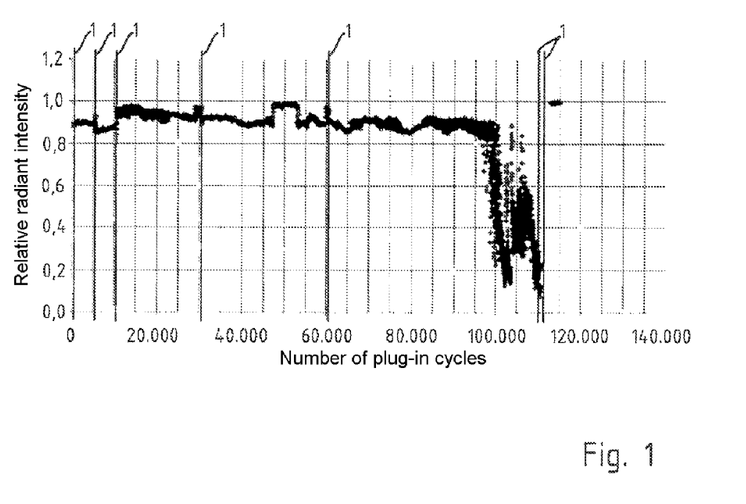
FIG. 1 shows a graphic evaluation of a service life test.

The optical contact element assigned to the coupling element on the sensor element side is advantageously formed with a ground bevel, and has a beam cross section enlarged by comparison with the optical fiber core. This solution has the advantage that the optical sensor element is particularly robust and, as has also been shown in experiments, withstands over 115000 plug-ins, which is also illustrated in FIG. 1.

Optical sensor elements are used for coordinate measuring machines in order to probe surfaces of workpieces or other objects without contact and with high precision, and to measure them or to check dimensional stability.

In the case of the inventive coupling, use is made as optical fiber for transmitting measuring signals of, in particular, a single mode fiber that has a core diameter of below 10 μm and is extraordinarily susceptible to irreversible contamination and damage in the core region. Such contamination or damage very quickly increases the transmission loss and the backscatter, something which is extremely disadvantageous, particularly in the case of highly sensitive interferometric applications. This is where the invention steps in and proposes to mount, preferably to weld, onto the optical fiber an optical contact element that expands the beam cross section at the optical interface by a multiple in comparison with the optical fiber. The beam path at the optical interface should in this case be collimated. Owing to the widened beam cross section, a bidirectional optical signal transmission is ensured even when regions of the optical interface become impenetrable by the optical radiation owing to contamination or damage. Furthermore, the insertion attenuation and the backscatter are substantially reduced by the ground bevel at an end face of the contact element. The obliquely ground surface need not be coated and is easy to clean.

The beam cross section is advantageously enlarged at least by a factor of 5 by comparison with the optical fiber core. The beam cross sectional surface area is preferably enlarged by at least a factor of 10, 20 or 50. The enlarged beam cross section reduces the susceptibility of the sensor element to contamination and damage, including the case in which the contact elements do not come to bear against one another over their full surface area.

It is advantageous when the optical contact element is a lens, preferably a gradient index lens. Gradient index lenses have the great advantage that they are of cylindrical design and therefore can also be provided in an extension of the optical fiber. Independently of its length and the monomer fiber used, the gradient index lens permits an expansion of the beam cross section, approximately by a factor of ten—accompanied by a drop in divergence to a tenth. However, according to the invention it is also possible to use multi-mode fibers, in which case the requirement of beam expansion can be obviated in the transition region.

The optical fiber should expediently be surrounded by a ferrule or an end sleeve. In this case, the ferrule protects the end of the optical fiber and fixes the latter in position. In addition, the ferrule can be arranged in the coupling element more effectively than can the optical fiber.

The ferrule should terminate flush with the optical contact element, in order to ensure an acceptable bearing of the obliquely ground end face of the optical contact element.

So that the optical sensor element can more easily be plugged into the coupling element on the measuring machine side, it is advantageous when the ferrule is arranged in a floating fashion in the coupling element. It is possible in this case for a lateral offset of the ferrule of a few hundred µm to be corrected during plugging in.

The ferrule advantageously has on a peripheral side an orientation surface for holding the ferrule in an assigned orientation. This ensures that the obliquely ground end faces come to bear against one another over their full surface area when the optical sensor element is coupled to the measuring machine.

A spring can be applied, preferably in an axial direction of the optical fiber, to the ferrules in order to produce a contact pressure at the optical interface.

It is expedient to provide a chamfer on a free end of the ferrule in order to facilitate the plugging in of the ferrule by the conical design.

The measuring machine, in particular a coordinate measuring machine, has a coupling element on the measuring machine side that can be coupled to a sensor element in accordance with one of claims 1 to 9.

Provided in the coupling element on the measuring machine side and the coupling element on the sensor element side are optical fibers that are held at one end in ferrules. The coupling element on the measuring element side preferably also has an optical contact element, and the ground bevels of the optical contact elements are formed and arranged so that they make all-over mutual contact in the coupled state and form an unbroken optical passage surface. The optical radiation can in this way be transmitted with low loss and in both directions via the optical interface.

Furthermore, one of the ferrules can be surrounded by a guide sleeve that projects in an axial direction beyond the ferrule, and is preferably provided at its free end with a chamfer on the inner surface. Such a guide sleeve likewise facilitates the bringing together of the optical contact elements during a coupling operation. The likewise floating bearing of the second ferrule in the guide sleeve in conjunction with the chamfers at the end sleeves and the guide sleeve enables self centering in the plug-in operation, which substantially relax the mechanical tolerances in the alignment of the ferrules before the plug-in contact.

In order to be able to further reduce a lateral offset between the ferrules that possibly exists before the plug-in operation, it is, in addition, provided that the inner surface of the guide sleeve has a roundness with a radial deviation that is much smaller than the core diameter of the fiber used. With normal monomer fibers to be a core diameter of approximately 9 µm given a wavelength of 1.5 µm, the roundness should be smaller than or equal to 1 µm, as a result of which a precise centering of the optical contact elements held in the ferrules is effected.

It is particularly advantageous when the guide sleeve and/or the ferrule is arranged exchangeably in the coupling element. This permits the optical fiber with the ferrule to be removed from the coupling element, and the end face of the optical contact element to be cleaned. It is preferred to use a special tool to loosen and fix the guide sleeve or ferrule, in order to render unauthorized manipulation of the coupling difficult.

Furthermore, a cover element for covering the end face of the optical contact element in the open state of the coupling can be provided at the end of the optical fiber. The intensity of the optical radiation used in coordinate measuring machines is certainly low, but damage can occur when the optical radiation impinges directly on sensitive body parts such as, for example, the optic nerves. A further advantage of the cover element is that the obliquely ground end face of the optical contact element in the plugged-out state is protected against damage and contamination.

The ferrules and the guide sleeve are produced from zirconium oxide. Zirconium oxide is a highly abrasion resistant material and ensures a constant precision of plugging in over the service life of the sensor element. Furthermore, it is possible to provide on a coupling element a cleaning device for cleaning the obliquely ground end faces of the optical contact elements. The cleaning device can be designed so that a cleaning element is wiped over the obliquely ground end face during plugging and unplugging.

The obliquely ground end faces of the optical contact elements can have an inclination angle $\alpha$ between 0° and 10°, preferably between 2° and 8°.

In order to further reduce possible backscatter at the optical interface, the end face of one of the optical contact elements can be provided with a coating, in particular an antireflection coating. In this case, the end face can also be polished level, that is to say not have a ground bevel. It is likewise possible to dispense with the ground bevel and a coating when the measurement method does not react sensitively to retroreflections.

Non-interfereometric measurement methods, such as chromatic confocal measurement, for example, require multimodal fibers. In this case, the diameter of the fiber core (for example 50 μm) is already substantially larger than in the case of monomode fibers. There is no longer a need here for beam expansion.

The invention is explained in more detail below with the aid of exemplary embodiments illustrated in the figures. In the drawing.

A graphic evaluation of a service life test is shown in FIG. 1. The relative intensity of the radiation transmitted via the optical coupling was measured as a function of the number of the plug-in cycles, the relative intensity being the ratio of the intensities of the optical radiation downstream and upstream of the optical coupling. Here, the end faces of the optical contact elements were cleaned at irregular intervals, something which is illustrated by vertical strokes 1. Up to a number of more than 95000 plug-in cycles, the coupling transmitted the optical radiation with a relative intensity in the range from 0.8 to 1. Only from the $100000^{th}$ plug-in cycle is there a marked drop in the relative radiant intensity. After a multiple intensive cleaning of the optical contact elements at 115000 plug-in cycles, however, it was possible once again to achieve an approximately lossless transmission with a relative radiant intensity of 1.

FIGS. 2 and 4 to 6 illustrate an optical sensor element 2 for a measuring machine, in particular for a coordinate measuring machine, in a detail with the aid of a coupling element 3 on the sensor element side. The coupling element 3 on the sensor element side is provided for mechanical and optical connection, and optical signal transmission to a measuring machine. The coupling element 3 on the sensor element side has an upper part 4 and a lower part 5 in this embodiment. The upper part 4 has two elements—a mechanical/electrical part 6 and an optical part 7. The mechanical/electrical part 6 is known in principle from U.S. Pat. No. 7,282,017 B2, to which reference is made here in full. A sleeve 8 that can be moved by a cam 9 is supported in an axially displaceable fashion in the upper part 4. In the coupled-in state, locking pins 10 come to bear in a locking fashion in grooves 11 of a bolt 13 inserted into an axial bore 12 (compare also FIG. 7). Arranged in the radially outer region of the mechanical/electrical part 6 are three pairs of balls in modules 15 that are parts of a three-point bearing 16. In the coupled state, cylinders 17 that are provided in the coupling element 18 on the measuring machine side come to bear against these balls 14.

Figure 2:
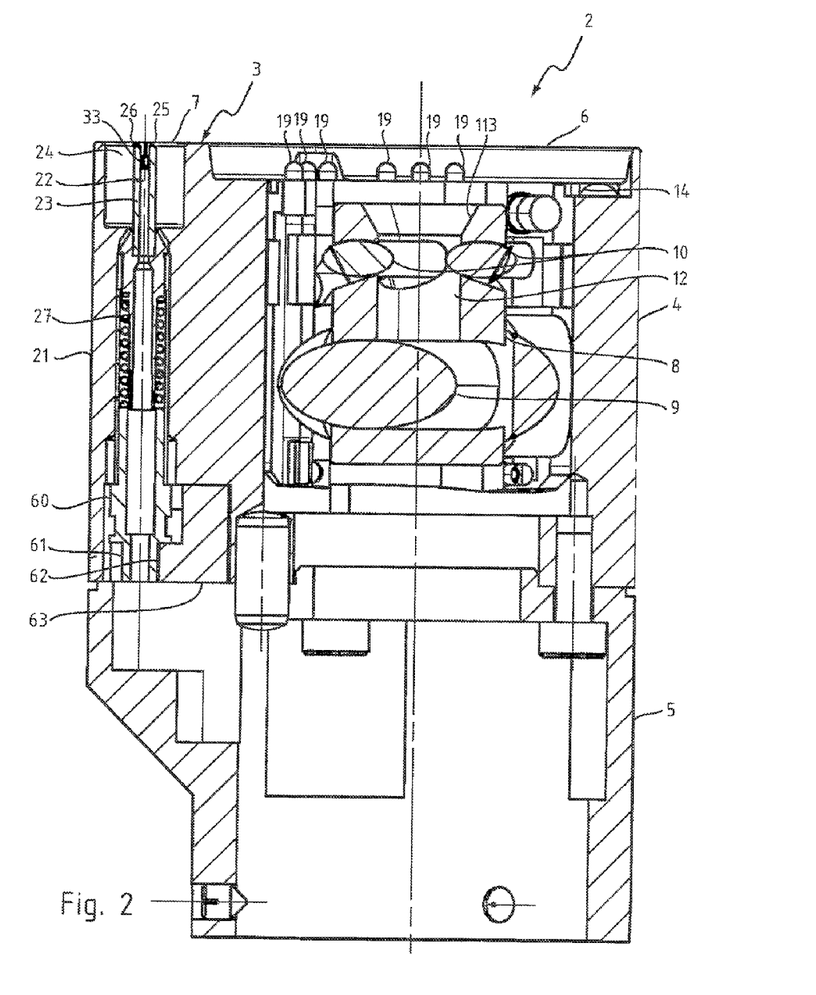
FIG. 2 shows a detail of an optical sensor element, a coupling element on the sensor element side being illustrated in cross section.

Spring loaded electrical pin contacts 19 are provided between the upper part 4 and the sleeve 8 for the purpose of electrically transmitting measuring signals.

To the left of the mechanical/electrical part 6, in the plane of the image, the optical part 7 is arranged in the upper part 4. Integrally formed for this purpose on the upper part 4 is a bracket 21 in which the optical part 7 is accommodated. An optical fiber 22 carrying the measuring signals extends through the lower part 5 as far as into the optical part 7 of the upper part 4, and is held at the end in a ferrule 23. The ferrule 23 projects into a cylindrical cutout 24 in the upper part 4 and has a chamfer 26 at its free end 25. A spring 27 is applied to the ferrule 23 in an axial direction of the optical fiber 22. The ferrule 23, and thus also the optical fiber 22, are supported in a floating fashion in the optical part 7 in order to compensate a lateral offset.

Figure 3:
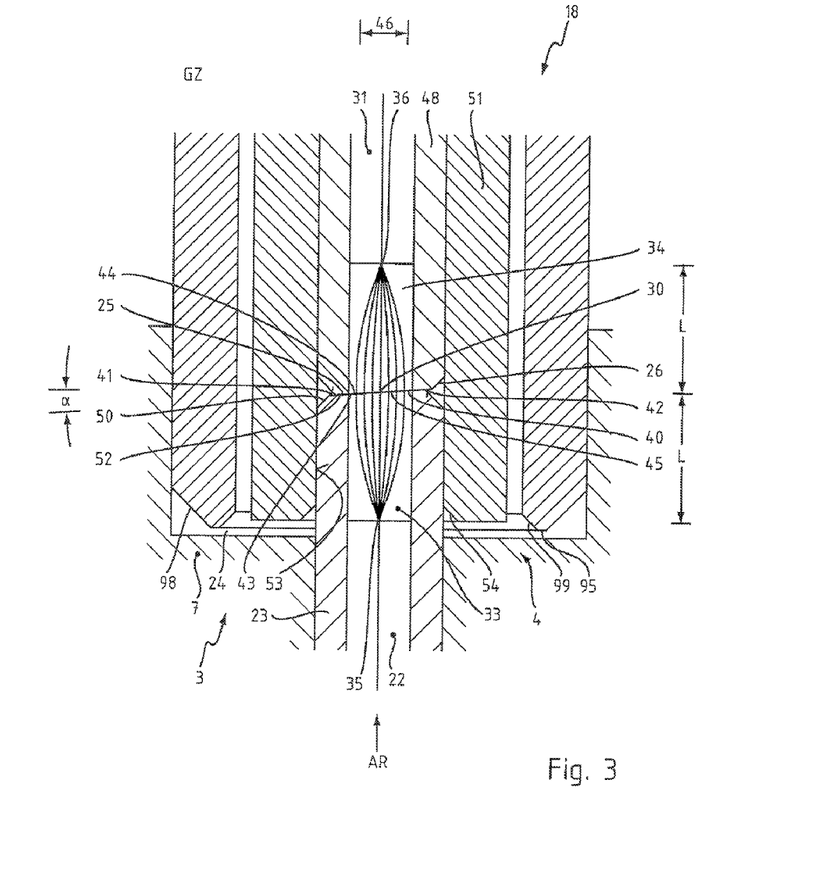
FIG. 3 shows a cross section at the optical interface in the coupled-in state.
Figure 4:
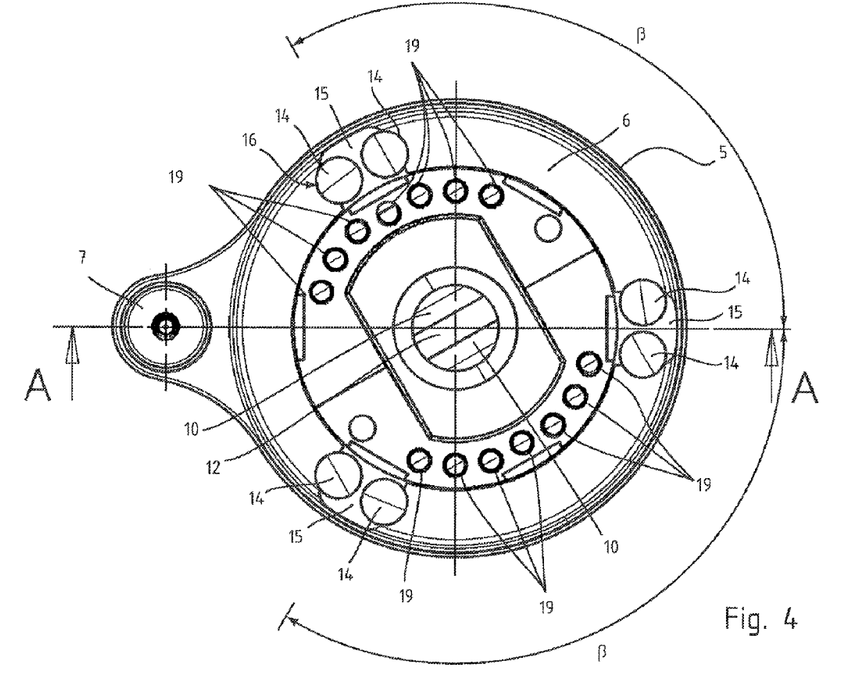
FIG. 4 shows a plan view of the coupling element on the sensor element side.
Figure 5:
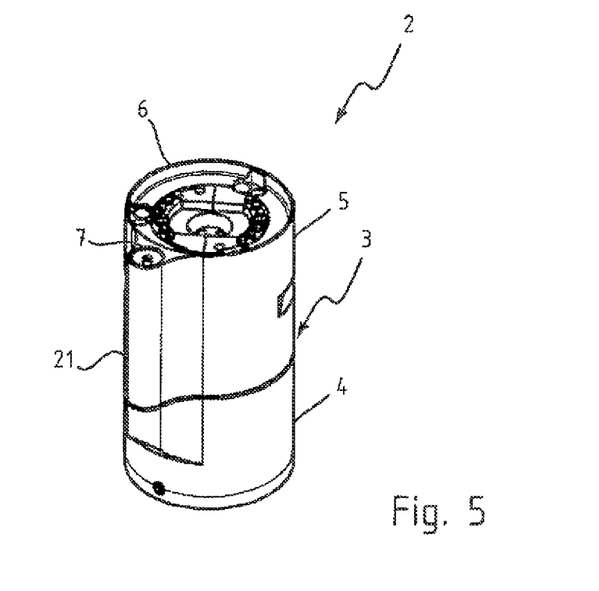
FIG. 5 shows a perspective view of the coupling element on the sensor element side.
Figure 6:
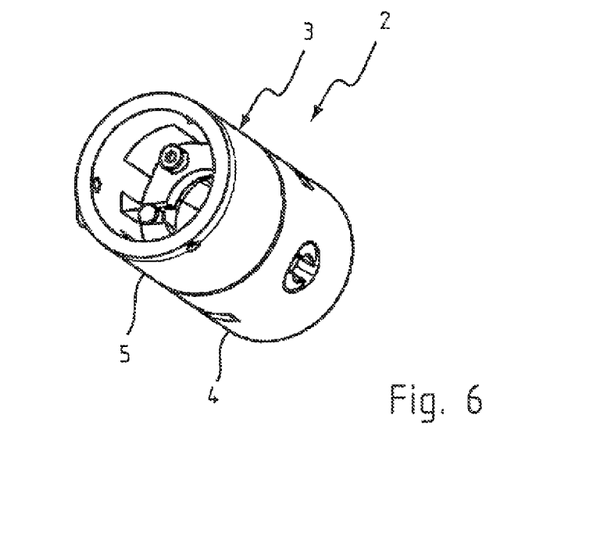
FIG. 6 shows a further perspective view of the coupling element on the sensor element side.

Shown in the coupled state (GZ) in a simplified schematic in FIG. 3 is an optical interface 30 at which the optical fiber 22 of the coupling element 3 on the sensor element side is coupled to the optical fiber 31 of the coupling element 18 on the measuring machine side. To be seen in this figure are two optical fibers 22, 31, which are coupled to one another via an optical sensor contact element 33 and an optical machine contact element 34. The optical fibers 22, 31 are single mode fibers with a core cross section of less than 10 μm. Optical contact elements 33, 34, gradient index fibers in this case by way of example, are welded onto the ends 35, 36 of the optical fibers 22, 31. The optical interface 30 is located in the surface 40 in which the optical contact elements 33, 34 make all-over mutual contact. The end faces 41, 42 of the optical contact elements 33, 34 are respectively to be provided with a ground bevel 43, 44 that has an inclination angle α of 4°. The ground bevels 43, 44 designed so that they form an unbroken optical passage surface 45.

In order to enlarge the beam cross section 46 at the optical interface 30 by comparison with the optical fibers 22, 31, the optical contact elements 33, 34 have suitable lengths L of ¼ pitch. The lengths of (2n−1)/4 pitch, n being a natural number, are, however, likewise possible. Optical contact elements 33, 34 of such design effect a collimated expansion of the optical radiation so that the beam cross section 46 is enlarged by a factor of 100 by comparison with the optical fibers 22, 31 at the optical interface 30.

The optical fibers 22, 31 and the optical contact elements 33, 34 are held in ferrules 23, 48. The ferrules 23, 48 terminate flush with the end faces 41, 42 of the contact elements 33, 34 in an extension of the ground bevels 43, 44. The ferrules 23, 48 are provided at the end with a chamfer 26, 50.

One ferrule 48 is surrounded by a guide sleeve 51 that projects beyond the free end 52 of the ferrule 48 in an axial direction AR. The guide sleeve 51 is provided at the end on the inner surface 53 with a chamfer 54. To center the optical contact elements 33, 34, the inner surface 53 of the guide sleeve 51 has a roundness with a radial deviation of at most 2 μm.

Looking back to FIGS. 2 and 4 to 6, there is provided below the spring 27 at the optical fiber 22 in the plane of the image a sleeve 60 that is provided on a peripheral side 61 with an orientation surface 62 in order to ensure the correct alignment of the obliquely ground end face 41 of the optical contact element 33. For this purpose, an orientation element 63 inserted into the upper part 4 bears against the orientation surface 62.

If the lower part 5 is screwed off the upper part 4, and the orientation element 63 is taken out of the upper part 4 by a tool, the optical fiber 22 and, with it, the ferrule 23 can be withdrawn downward from the upper part 4, for example in order to exchange defective parts or else for the purpose of cleaning. The ferrule 23 is therefore arranged exchangeably in the upper part.

A coupling element 18 on the measuring machine side is illustrated in FIGS. 7 to 10. The coupling element 18 on the measuring machine side is arranged in a holder that is part of the measuring machine head 70 and can be fastened on a measuring machine (not illustrated in more detail), in particular on a movable arm of the measuring machine.

Figure 7:
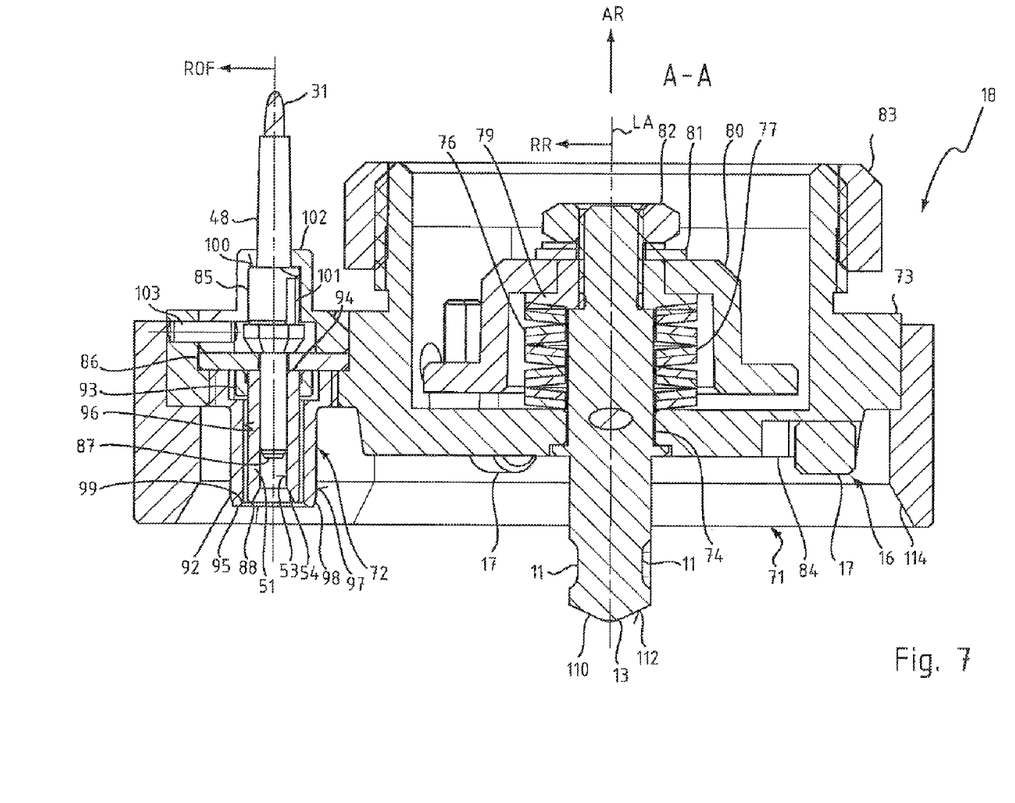
FIG. 7 shows a coupling element on the measuring machine side, in cross section.
Figure 8:
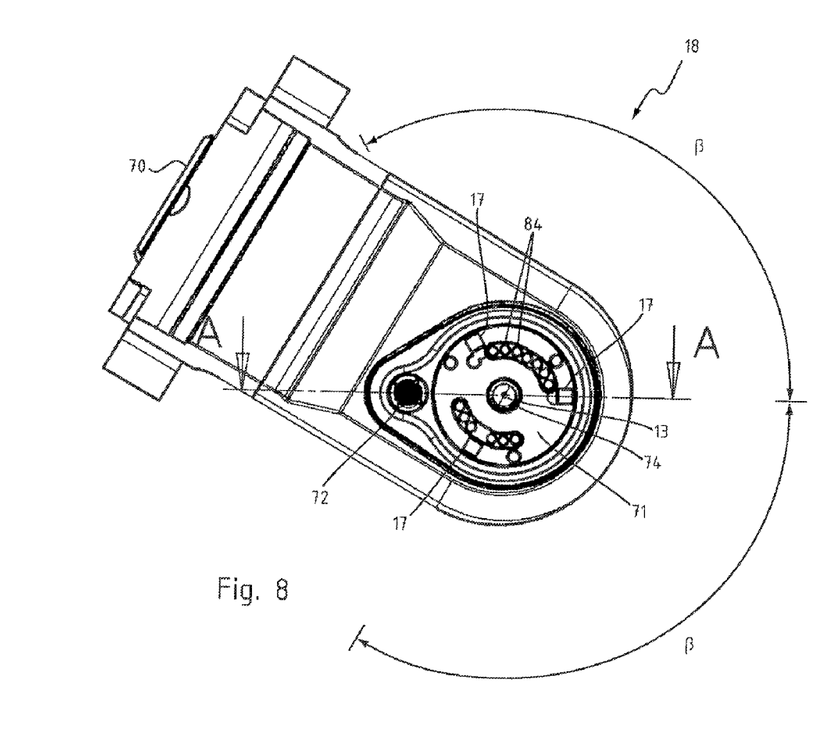
FIG. 8 shows the coupling element on the measuring machine side in a view from below.

In accordance with the coupling element 3 on the sensor element side, the coupling element 18 on the measuring machine side also has elements in the form of a mechanical/electrical part 71 and optical part 72.

The mechanical/electrical part 71 is likewise known in principle from U.S. Pat. No. 7,282,017 B2 as regards design. Provided in the coupling element 18 on the measuring machine side is an insert 73 that has a central axial bore 74 through which the bolt 13 is plugged. A stack 76 of disk springs 77 is applied to the bolt 13 in an axial direction AR in order to provide a uniform contact pressure on the three point bearing 16, and tolerance compensation. In the coupling element 18 on the measuring machine side, the three point bearing 16 comprises three cylinders 17 that are arranged offset from one another about the longitudinal axis LA of the coupling element 18 on the measuring machine side by an angle β of 120°. The stack 76 of disk springs 77 is held in position by a flange sleeve 79 and a hat-shaped part 80. The flange sleeve 79 and the hat-shaped part 80 are fixed on the bolt 13 by a washer 81 and a nut 82. The coupling element 18 on the measuring machine side is fastened on the measuring machine head 70 by a ring 83 that is screwed on.

In a radial direction RR between the longitudinal axis LA of the coupling element 18 and the cylinders 17 of the three point bearing 16, there are arranged in a fashion distributed on the periphery for the purpose of electrical transmission of measuring signals thirteen conducting elements 84 against which the pin contacts 19 of the coupling element 3 on the sensor element side come to bear in the plugged-in state.

The optical part 72 is provided laterally on the mechanical/electrical part 71. An optical fiber 31 is guided into the coupling element 18 on the measuring machine side, and held at the end in a ferrule 48. The ferrule 48 has a collar 85 that bears against a backing plate 86. The guide sleeve 51 is pushed onto a free end 87 of the ferrule 48 and is supported on the backing plate 86. At its free end 88, the guide sleeve 51 has a chamfer 54 on the inner surface 53. The ferrule 48 and the guide sleeve 51 are held in a floating fashion in the optical part 72, something which is clearly visible from the radial spacing between a sleeve 92 and the guide sleeve 51 that is surrounded by the sleeve 92. In order to secure the guide sleeve 51 against axial displacements, a fixing sleeve 93 is pushed onto the inner end 94 of the guide sleeve 51 and fixed there. The sleeve 92, which surrounds the guide sleeve 51 at a radial spacing, is screwed into the insert 73. At its free end 95, the sleeve 92 has peripheral chamfers 98, 99 both on the inner side 96 and on the circumferential side 97.

A special tool can be used to screw the fixing sleeve out of the coupling element 18 on the measuring machine side. It is thereby possible to take out the guide sleeve 51, which can, if appropriate, be cleaned or exchanged. In this state, the ferrule 48 can also be effectively accessed for cleaning.

On the side 100 averted from the guide sleeve 51, the ferrule 48 has an orientation surface 101 for the purpose of aligning the obliquely ground end face 42 of the optical machine contact element 34 in such a way as to ensure all-over seating of the end faces 41, 42 of the optical contact elements 33, 34, as is also shown in FIG. 3. A cover 102 engages in the orientation surface 101. The cover 102 is secured against rotations by a locating pin 103 pushed into the insert 73 in a radial direction ROF relative to the optical fiber 31.

Figure 9:
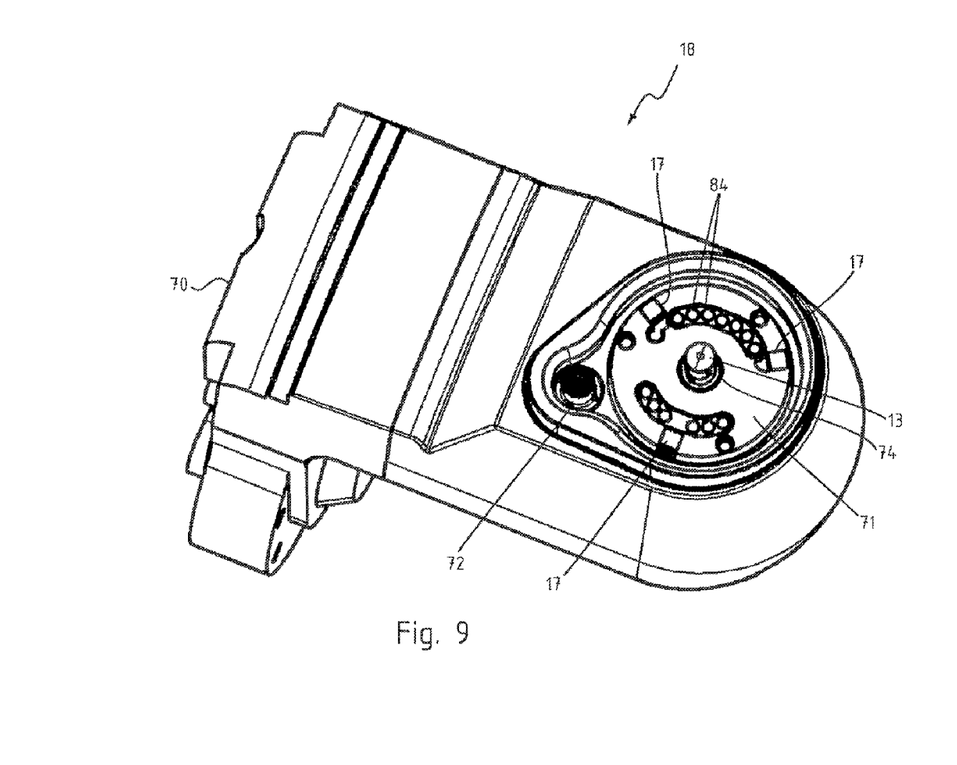
FIG. 9 shows the coupling element on the measuring machine side in a perspective view.
Figure 10:
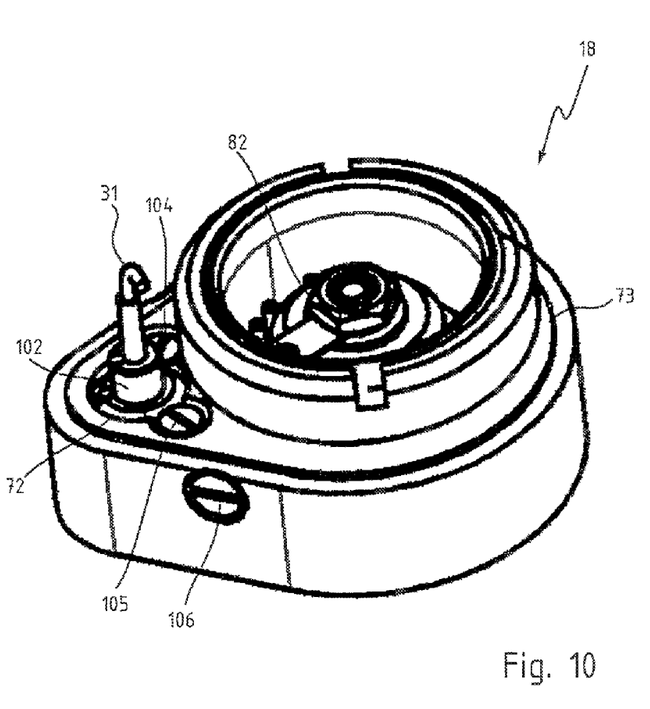
FIG. 10 shows the coupling element on the measuring machine side in a perspective view from obliquely above.

FIG. 9 shows how the cover 102 of the optical part 72 is fastened on the insert 73 by two screws 104, 105. The insert 73 is likewise fixed in the coupling element 18 on the measuring machine side by two screws 106.

The two coupling elements 3, 18 are designed so that during the plugging-in operation conical surfaces interact in a predetermined sequence in order to compensate a lateral offset and to ensure a highly precise coupling of the coupling elements 3, 18. During plugging in, the conical surface 110 comes into contact at the free end 112 of the bolt 13 with the funnel-shaped expansion 113 of the axial bore 12 in the displaceable sleeve 8 of the coupling element 3 on the sensor element side, and a peripheral chamfer 114 on the coupling element 18 on the measuring machine side comes to bear against the coupling element 3 on the sensor element side. In order to couple the optical parts 7, 72, the sleeve 92 on the coupling element 18 on the measuring machine side is firstly pushed into the cylindrical cutout 24 in the coupling element 3 on the sensor element side, before the ferrule 23 of the coupling element 3 on the sensor element side is pushed into the guide sleeve 51, supported in a floating fashion, of the coupling element 18 on the measuring machine side. In this way, the obliquely ground end faces 41, 42 of the optical contact elements 33, 34 come to bear against one another with a maximum lateral offset of 2 μm.

LIST OF REFERENCE SYMBOLS

1—Stroke
2—Sensor element
3—Coupling element on the sensor element side
4—Upper part of 3
5—Lower part of 3
6—Mechanical/electrical part of 3
7—Optical part of 3
8—Sleeve
9—Cam
10—Locking pin
11—Groove
12—Axial bore
13—Bolt
14—Ball
15—Module
16—Three point bearing
17—Cylinder
18—Coupling element on the measuring machine side
19—Pin contact
21—Bracket
22—Optical fiber
23—Ferrule
24—Cutout
25—End of 23
26—Chamfer
27—Spring
30—Optical interface
31—Optical fiber
33—Contact element
34—Contact element
35—End of 22
36—End of 31
40—Surface
41—End face of 33
32—End face of 34

43—Ground bevel
44—Ground bevel
45—Passage surface
46—Beam cross section
48—Ferrule
50—Chamfer
51—Guide sleeve
52—End of 48
53—Inner surface of 51
54—Chamfer
60—Sleeve
61—Peripheral side of 60
62—Orientation surface
63—Orientation element
70—Part of the measuring machine head
71—Mechanical/electrical part
72—Optical part
73—Insert
74—Bore
76—Stack
77—Disk spring
79—Flange sleeve
80—Hat-shaped part
81—Washer
82—Nut
83—Cover
84—Conducting element
85—Collar
86—Backing plate
87—End of 48
88—End of 51
92—Sleeve
93—Fixing sleeve
94—End of 51
95—End of 92
96—Inner side of 92
97—Circumferential side of 92
98—Chamfer
99—Chamfer
100—Side of 48
101—Orientation surface
102—Cover
103—Locating pin
104—Screw
105—Screw
106—Screw
110—Surface of 13
112—End of 13
113—Expansion
114—Chamfer
AR—Axial direction
GZ—Coupled state
L—Length
LA—Longitudinal axis
ROF—Radial direction
RR—Radial direction
α—Inclination angle
β—Angle

The invention claimed is:

1. A system comprising a coordinate measuring machine and an optical sensor element for the coordinate measuring machine, wherein
the coordinate measuring machine comprises a coupling element on the coordinate measuring machine side and an optical machine contact element, the optical machine contact element being held in a second ferrule surrounded by a guide sleeve as an integral part of the coupling element on the machine measuring side, both the second ferrule and the guide sleeve being supported in a floating fashion in the machine contact element, and
the optical sensor element comprises:
a coupling element on a sensor element side adapted to be mechanically and optically connected to the coupling element on the coordinate measuring machine side; and
a first optical fiber for transmission of measuring signals in the coupling element on the sensor element side that has an optical interface adapted to be connected to the optical machine contact element of the coordinate measuring machine, which optical interface is formed by an optical sensor contact element, for transmission of optical signals, having a self-centering first ferrule surrounding an end of the first optical fiber, the first ferrule being supported in a floating fashion in the coupling element on the sensor element side,
wherein the coupling element on the sensor element side is designed to be connected with the optical machine contact element by a plugging-in operation,
the optical machine contact element has a second optical fiber within the second ferrule and the guide sleeve, and
the second optical fiber is held at one end in the second ferrule and surrounded by the guide sleeve, the guide sleeve projecting in an axial direction beyond the second ferrule.

2. The system as claimed in claim 1, wherein the first ferrule has a chamfer for self-centering during a connecting operation with the coupling element on the coordinate measuring machine side.

3. The system as claimed in claim 1, wherein the sensor contact element for transmission of measuring signals is formed with a ground bevel.

4. The system as claimed in claim 1, wherein the sensor contact element for transmission of measuring signals has a beam cross section enlarged by comparison with a core of the first optical fiber for transmission of optical signals.

5. The system as claimed in claim 1, wherein the sensor contact element for transmission of measuring signals has a beam cross section enlarged by comparison with a core of the first optical fiber for transmission of optical signals, the beam cross section being enlarged at least by a factor of 5, 10, 20 or 50 by comparison with the core of the optical fiber for transmission of optical signals.

6. The system as claimed in claim 1, wherein the sensor contact element is a lens, a gradient index lens, or in the form of a fiber.

7. The system as claimed in claim 1, wherein the first and/or second optical fiber for transmission of optical signals is a single mode fiber.

8. The system as claimed in claim 1, wherein the first ferrule terminates flush with the sensor contact element.

9. The system as claimed in claim 1, wherein the first ferrule has on a peripheral side an orientation surface for holding the first ferrule in a defined fashion in an assigned orientation.

10. The system as claimed in claim 1, wherein a spring is applied to the first ferrule in order to produce a contact pressure at the optical interface.

11. The system as claimed in claim 1, wherein the coupling element on the coordinate measuring machine side is designed to be connected to the optical sensor element, wherein the optical machine contact element is designed to be connected to the optical sensor contact element of the optical sensor element for the purpose of transmission of measuring signals, wherein the optical machine contact element has the second optical fiber within the second ferrule and the guide sleeve as an integral part of the coupling element on the coordinate machine measuring side for self-centering of the first ferrule of the sensor contact element and for self-centering of the second ferrule of the optical machine contact element.

12. The system as claimed in claim 11, wherein a free end of the second ferrule or the guide sleeve have/has a chamfer for self-centering during a connecting operation with the optical sensor element.

13. The system as claimed in claim 11, wherein the machine contact element is formed with a ground bevel and has a beam cross section that is enlarged by comparison with a core of the second optical fiber for transmission of optical signals.

14. The system as claimed in claim 11, wherein an inner surface of the guide sleeve has a roundness with a radial deviation that is smaller than a core diameter of the fiber used.

15. The system as claimed in claim 11, wherein an inner surface of the guide sleeve has a roundness with a radial deviation that is smaller than a core diameter of the fiber used and is at most 2 um.

16. The system as claimed in claim 11, wherein a spring is applied in an axial direction of the optical fiber to the first ferrule in order to produce a contact pressure at the optical interface.

17. The system as claimed in claim 11, comprising a cylinder cutout in the coupling element on the sensor element side forming a gap around a free end of the first ferrule with respect to the coupling element on the sensor element side.

18. The system as claimed in claim 1, wherein the optical machine contact element is designed for the purpose of transmission of measuring signals for interferometric measurement methods.

19. The system as claimed in claim 1, comprising the second ferrule being in contact with the guide sleeve.

* * * * *